May 12, 1931.  R. C. GOOD ET AL  1,804,763
PROCESS OF MAKING CAR WHEELS
Filed Jan. 9, 1928   2 Sheets-Sheet 2

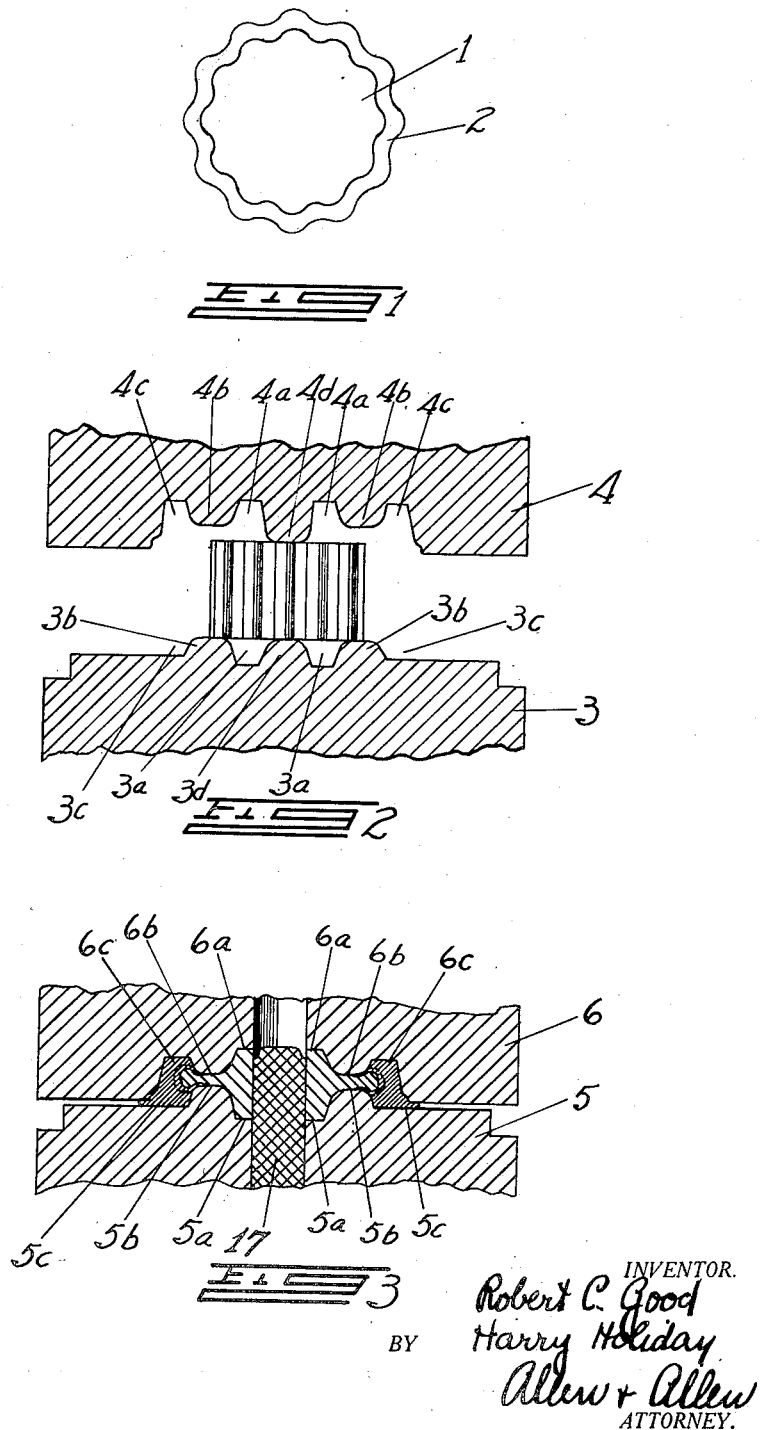

INVENTOR.
Robert C. Good
Harry Holiday
BY Allen & Allen
ATTORNEY.

Patented May 12, 1931

1,804,763

UNITED STATES PATENT OFFICE

ROBERT C. GOOD, OF EDGEWOOD, AND HARRY HOLIDAY, OF GLENSHAW, PENNSYLVANIA, ASSIGNORS, BY MESNE ASSIGNMENTS, TO THE AMERICAN ROLLING MILL COMPANY, OF MIDDLETOWN, OHIO, A CORPORATION OF OHIO

PROCESS OF MAKING CAR WHEELS

Application filed January 9, 1928. Serial No. 245,296.

Our invention relates to wrought steel car wheels formed of a hard steel at the rim, and a soft steel at the plate and hub.

The desirability of forming car wheels with a hard steel rim has been recognized for years. The tempering of a cast steel wheel to hardness at the rim is not satisfactory under modern conditions because the temper is lost due to heating and cooling of the wheels in service. It has not proven commercially satisfactory to cast the rim of different steel than the plate and hub, and it is not safe to form a car wheel of a steel which is all of sufficient hardness to withstand wear at the rim, because this results in too brittle a plate and hub. At the present day, therefore, both in wrought wheels and in cast wheels, the industry is resorting to a compromise so as to provide a wheel which is as hard as possible at the rim, and yet possesses sufficient structural strength and resistance to lateral shock as will withstand as much strain as possible.

We have discovered that a wheel can be forged by pressing and rolling operations from a block of metal having an exterior of hard steel and an interior of tough steel in such a way as to force all of the hard steel into the wheel rim. Thus, we provide a wrought steel wheel with a hard steel rim, as of some air hardening steel which will not lose its temper, and of a tough steel plate and hub which will not be brittle.

We have discovered that by a proper proportioning of the hard steel outside to soft steel inside in an ingot slice, and using a die for forging the same, which is properly designed, that in the forging operation the rim can be formed containing all of the hard steel except for a bead (bulb shaped in cross-section) of soft steel, which is a continuation of the rim, and definitely keys the rim to the plate so that under the severest tests it is not possible to break the rim away at the joint.

We have also discovered that by corrugating the core of the ingot (of the soft steel) and then pouring hard steel about this core in a larger ingot mold, that the corrugations persist in the wrought wheel, thus positively preventing the rim from revolving with relation to the plate.

We do not find that it is essential that the core of the ingot should be welded to the outer surface thereof, since the operation of forging the wheel will result in the keying action of one metal into the other which has been referred to above. To prevent relative rotation of the plate and rim in a practice which does not employ a corrugated core, we propose to forge the wheel slightly off center, or to set the core in the ingot slightly off center.

In the specification that follows, we describe in detail one of the modes of procedure in the formation of our novel wheel, and will append claims stating the invention inherent in our process and product.

In the drawings:—

Figure 1 is a section taken through a slice taken from an ingot following our invention.

Figure 2 is a diagram illustrative of the first forging step of our preferred process.

Figure 3 is a diagram of the dies and wheels at the end of the finishing forging step.

Figure 4:
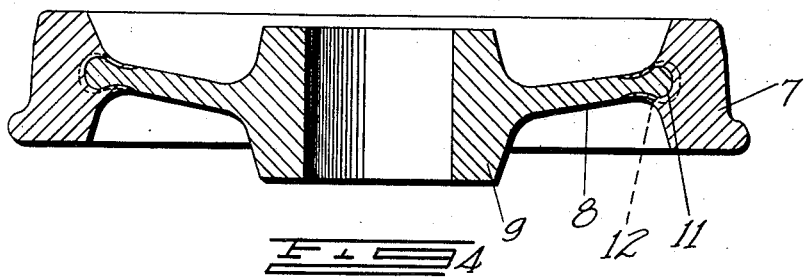
Figure 4 is a cross section of a wheel formed in accordance with our invention, showing the two kinds of metal by shading and division lines.

Referring to Figure 1, we first, in our preferred process, cast a corrugated ingot of a steel which will be ideal from the point of view of strength, which we will call tough steel. So far as we can determine, there are no qualifying factors which will limit the selection of whatever steel is desired. This ingot becomes the core 1, of an ingot cast in a larger corrugated mold within which the core is suspended.

We have pickled the core ingot and heated it warm enough to remove moisture when casting around it as a core, as we do not find that the outer portion needs to have a welded joint to the inner section. The resultant ingot has an outer portion 2 formed of the steel poured into the second mold, which can be ideal from the point of view of hardness, air temper, and resistance to wear. The steel of the outer portion of the ingot we will term "hard" steel, meaning a steel satisfactory from the point of view for wheel rims, but not for plates and hubs. The heating following pickling should preferably remove the hydrogen left in the metal because of the acid treatment.

For purposes of illustration we will state the proportions in an ingot, slices of which will form a 29 inch wrought wheel as 19 inches in diameter with a tough steel core 14 inches in diameter. This proportion of tough to hard steels will be such, in our example, as to provide, in the mold illustrated in the drawings, for not quite enough hard steel to equal the solid contents of the rim including the fillet between the rim and the plate.

It will be understood that for various forms of wheels the proportions would be subject to variations, but it is our discovery that the result of the forging of a cylindrical ingot slice or block, so as to expand it into the shape of a car wheel, with a hub, plate and rim, will be such that the metal at the outside of the ingot will all be forced to the outside of the dies, filling in the rim space to the extent that it can, with the juncture between the hard and the soft metal being bulb shaped in cross section due to the results of friction and compression acting within the dies.

Apparently the metal of the block under treatment first bulges out at the center, and then flows at the surface so that some of the interior metal is entrapped in the outer metal, with all the outer metal flowing to the outside of the dies.

Referring to dies such as are illustrated, the fixed section or female section is shown at 3, in the first set that we use in this instance, and the movable or male section at 4.

The hub forming portions are 3a and 4a respectively, the plate forming portions 3b and 4b, and the rim forming sections 3c and 4c. The axle hole forming portions are at 3d and 4d.

The ingot slice, formed by sawing off a section of an ingot of correct volume to fill the dies, is heated until soft and then set between the die sections, whereupon the movable section is brought down to close the die. This results in the formation of a wheel blank.

The resultant blank, in our example, is then given a finishing forging or pressing in dies 5 and 6, having hub portions 5a and 6a, plate portions 5b and 6b, rim portions 5c and 6c, and the die portions have hollow hubs through which a plunger 17 is passed to punch out the axle hole, which is not completely formed in the first operation.

The wheel is then rolled in a mill for trimming it up and giving it a good true surface.

In some forging processes the blank from the first forging is not so complete a wheel, as in the illustrated processes, but the flow of metal will not vary substantially.

The forged body, as indicated, has a rim 7 of hard steel, and a plate 8 and hub 9 of tough steel.

Figure 5:
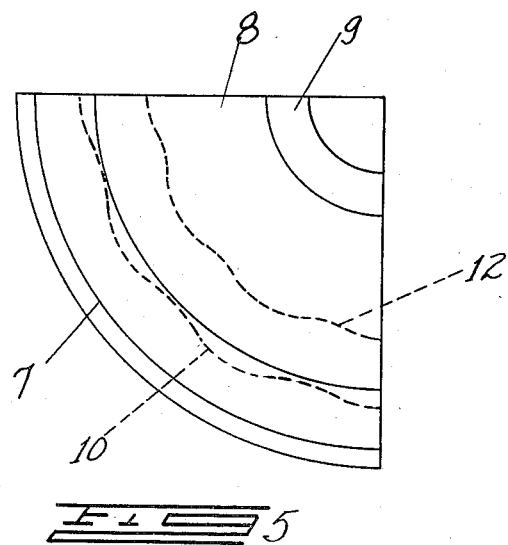
Figure 5 is a plan view of a segment of the wheel, showing in dotted lines the zones of the different metals therein.
Figure 6:
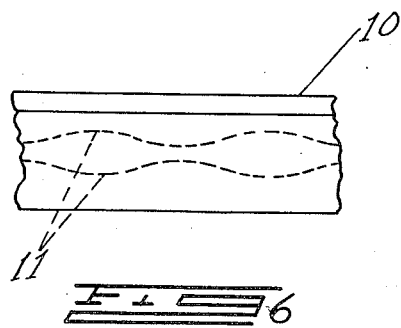
Figure 6 is an end elevation of the wheel showing in dotted lines the bead or bulb section of soft metal within the rim.

The entrapped portion of the tough steel will retain its corrugated shape, as indicated by the line 10 in Figure 5. Also, the tough metal will be entrapped in such a form, bulb like in cross section, as is shown at 11, within the wheel rim, or collet, as at 12. This portion 11, termed by us a bead, will have varying thickness as well as periphery, as will be noted in the dotted lines marked 11 in Figure 6. In Figure 5 the line 12 indicates the end of the hard metal of the rim where it overlaps the bead.

It may be desirable to cut down the size of this bead or to make it extend less deeply into the rim or collet, and this is to be controlled by the composition of the ingot slice and the shape of the dies.

It will be observed from Figures 4 to 7 that the rim cannot leave the plate because the plate has a bead which is partially surrounded by the rim. Also it will be evident that the rim cannot revolve on the plate because of the corrugated periphery of the tough metal.

We have evidence which would indicate that the tremendous strain which is usually present in the rim of a single metal wrought wheel, due to the effect of cooling of the steel, is largely absent from our wheel, due probably to the softer plate steel, giving enough to release the tremendous strain that it imposes on the rim.

In a wheel forged to substantially the shape and of substantially the structure shown in the drawings, from an ingot slice alike to that one illustrated, where the core was not even in direct contact with the outer body of the slice, we have demonstrated the complete rigidity of the juncture of the two metals by dropping a 20,000 pound ball from a height of 75 ft. against the rim of the wheel supported vertically beneath the ball, without breaking up the wheel, and without stripping away the rim from the plate. Also, 800 blows with an 800 pound trip hammer falling 12 ft. striking the hub of the wheel, failed to break the wheel or pull the plate away from the rim. This trip hammer test merely shifted the position of the hub slightly by the plate bending.

The wheel of our invention and the process we propose for making it, permit a wide latitude in selection of steels and does away with the necessity of compromise. The hard metal is segregated in the rim, and embraces, in our preferred wheel, a bead of the tough metal which is co-extensive with the plate.

Having thus described our invention, what we claim as new and desire to secure by Letters Patent, is:—

1. That process of forming a wheel, which consists in forming a metal block having a hard metal exterior and a tough metal interior, and forging said block in dies arranged to expand it into a wheel having a rim, plate and hub, the exterior metal of the block being insufficient to fill the rim portion defined by the pressing means.

2. That process of forming a wheel, which consists in forming a metal block having a corrugated core of tough metal and an exterior of hard metal, and forging said block in dies arranged to expand it into a wheel having a rim, plate and hub.

3. That process of forming a wheel, which consists in forming a metal block having a corrugated core of tough metal and an exterior of hard metal, and forging said block in dies arranged to expand it into a wheel having a rim, plate and hub, the exterior metal of the block being insufficient to fill the rim portion defined by the molding means.

ROBERT C. GOOD.
HARRY HOLIDAY.